(12) United States Patent
Vanstone et al.

(10) Patent No.: US 6,738,478 B1
(45) Date of Patent: May 18, 2004

(54) POWER SIGNATURE ATTACK RESISTANT CRYPTOGRAPHY

(75) Inventors: Scott A. Vanstone, Campbellville (CA); Robert P. Gallant, Mississauga (CA)

(73) Assignee: Certicom Corp., Ontario (CA)

( * ) Notice: Subject to any disclaimer, the term of this patent is extended or adjusted under 35 U.S.C. 154(b) by 0 days.

(21) Appl. No.: 09/582,499

(22) PCT Filed: Oct. 5, 1999

(86) PCT No.: PCT/CH99/00919

§ 371 (c)(1), (2), (4) Date: Sep. 5, 2000

(87) PCT Pub. No.: WO00/25204

PCT Pub. Date: May 4, 2000

(51) Int. Cl.$^7$ .............................................. G06F 17/30
(52) U.S. Cl. ........................... 380/28; 380/30; 380/282; 709/226
(58) Field of Search ........................... 380/28, 30, 282; 713/174, 175, 168, 172; 708/491, 492, 650; 709/226

(56) References Cited

U.S. PATENT DOCUMENTS

| | | | |
|---|---|---|---|
| 6,252,959 B1 * | 6/2001 | Paar et al. ..................... | 380/28 |
| 6,263,081 B1 * | 7/2001 | Miyaji et al. .................. | 380/28 |
| 2001/0033655 A1 * | 10/2001 | Vadekar et al. ............... | 380/28 |
| 2002/0041681 A1 * | 4/2002 | Hoffstein et al. ............. | 380/28 |
| 2002/0057796 A1 * | 5/2002 | Lambert et al. .............. | 380/28 |
| 2003/0123655 A1 * | 7/2003 | Lambert et al. .............. | 380/28 |

OTHER PUBLICATIONS

Agnew GB et al: "An Implementation of Elliptic Curve Cryptosystems Over F2155" IEEE Journal on Selected Areas in Communications, vol. 11, No. 5, p. 804–813 XP399849 IEEE Inc. New York ISSN:0733–8716 p. 808, right–hand column, line 23–line 26, relevant to claim No. 1–3.

Kocher PC: "Timing attacks on implementations of Diffie–Hellman, RSA, DSS, and other systems" Advances in Cryptology—Crypto '96 16TH Annual International Cryptology Conference. Proceedings, Advances in Cryptology—Crypto '96, Santa Barbara, CA, USA Aug. 18–22, 1996, pp. 104–113, XP626590 1996, Berlin, Germany, Springer–Verlag, Germany ISBN: 3–540–61512–1 cited in the application section 9, relevant to claim No. 1–3.

* cited by examiner

*Primary Examiner*—Charles Rones
*Assistant Examiner*—Hassan Mahmoudi
(74) *Attorney, Agent, or Firm*—Finnegan, Henderson, Farabow, Garrett, & Dunner, L.L.P.

(57) ABSTRACT

This invention provides a method of computing a multiple k of a point P on an elliptic curve defined over a field, the method including the steps of representing the number k as binary vector $k_1$, forming an ordered pair of point $P_1$ and $P_2$, wherein the points $P_1$ and $P_2$ differ at most by P, and selecting each of the bits $k_i$ in sequence, and for each of the $k_i$, upon $k_i$ being a 0, computing a new set of points $P_1'$, $P_2'$ by doubling the first point $P_1$ to generate the point $P_1'$ and adding the points $P_1$ and $P_2$ to generate the point $P_2'$ or upon $k_i$ being a 1, computing a new set of points $P_1'$, $P_2'$ by doubling the second point $P_2$ to generate the point $P_2'$ and adding the points $P_1$ and $P_2$ to produce the point $P_1'$, whereby the doubles or adds are always performed in the same order for each of the bits $b_i$, thereby minimizing a timing attack on the method. An embodiment of the invention applies to both multiplicative and additive groups.

3 Claims, 4 Drawing Sheets

POWER SIGNATURE ATTACK RESISTANT CRYPTOGRAPHY

This invention relates to a method and apparatus for minimizing power signature attacks in cryptographic systems.

BACKGROUND OF THE INVENTION

Cryptographic systems generally owe their security to the fact that a particular piece of information is kept secret without which it is almost impossible to break the scheme. The secret information must generally be stored within a secure boundary in the cryptographic processor, making it difficult for an attacker to get at it directly. However, various schemes or attacks have been attempted in order to obtain this secret information. One of these is the timing or power signature attack.

The timing attack (or "side channel attack") is an obvious result of sequential computational operations performed during cryptographic operations. The attack usually exploits some implementation aspect of a cryptographic algorithm.

For example current public key cryptographic schemes such as RSA and elliptic curve (EC) operate over mathematical groups; $Z^*_n$ (n=pq) in RSA, discrete log systems in a finite field $F^*_q$ (q is a power of a prime), $F^*_{2^M}$ or an EC group over these finite fields. The group operations, called multiplication modulo n, in RSA, and addition of points in EC are sequentially repeated in a particular way to perform a scalar operation. In RSA the operand is called an exponent, the operation is called exponentiation and the method of multiplying is commonly known as repeated square-and-multiply. Thus given a number $a \epsilon Z^*_n$ and an integer $0 \leq k < p$, the exponent, whose binary representation is $k = \Sigma_{1=0}^{i} k_i 2^i$ a value $a^k$ mod n may be calculated by repeated use of the "square-and-multiply" algorithm (described in Handbook of Applied Cryptography P.615). Similarly given $g(x) \epsilon F_p m$ and an integer $0 \leq k \leq p^m - 1$ then $g(x)^k$ mod $f(x)$ may be calculated by this method.

On the other hand, in EC the operand is a scalar multiplier, the operation is called scalar multiplication of a point, and the method is known as "double-and-add". Thus if k is a positive integer and P is an elliptic curve point then kP may be obtained by the "double-and-add" method. Both these methods are well known in the art and will not be discussed further.

As mentioned earlier, an attacker once in possession of the private key (either long term or session) is able to forge signatures and decrypt secret messages for the attacked entity. Thus it is paramount to maintain the secrecy or integrity of the private key in the system.

Many techniques have been suggested to obtain the private key. The encryption operations are performed either in a special purpose or general-purpose processor operating in a sequential manner. Recent attack methods have been proposed in open literature as for example described in Paul Kochers's article "Timing attacks on implementations of Diffie-Hellman, RSA, DSS and other systems". These attacks have been based on timing analysis of these processors or in other words timing analysis of 'black box' operations. In one instance an attacker by capturing the instantaneous power usage of a processor throughout a private key operation obtains a power signature. The power signature relates to the number of gates operating at each clock cycle. Each fundamental operation as described in the preceding paragraph generates a distinct timing pattern. Other methods exist for obtaining a power signature than instantaneous power usage.

Laborious but careful analysis of an end-to-end waveform can decompose the order of add-and-double or square-and-multiply operations. Using the standard algorithm, either a double or square must occur for each bit of either the exponent or scalar multiplier respectively. Therefore, the places where double waveforms are adjacent each other represent bit positions with zeros and places where there are add waveforms indicate bits with ones. Thus, these timing measurements can be analyzed to find the entire secret key and thus compromise the system.

In addition to the "square and multiply" or "double and add" techniques mentioned earlier, other methods to compute kP are for example the "binary ladder" or Montgomery method described in "Speeding the Pollard and Elliptic Curve Methods of Factorization" by Peter L. Montgomery. In this method the x-coordinates of the pair of points (iP, (i+1)P) are computed. The Montgomery method is an efficient algorithm for performing modula multiplication, more clearly illustrated by an example. Given a group E ($F_p$) and given a point P on the elliptic curve, the Montgomery method may be used to compute another point kP. Given an ordered pair of points (iP, (i+1)P), then for each of the bits of the binary representation of k, if bit i is a 0 then the next set of points computed is (2iP, (2i+1)P) and if bit i is 1, then the next set of points is ((2i+1)P, (2i+2)P), that is, the first of the pair is derived from a doubling or an adding depending on whether the bit is a 0 or 1.

In a processor, each of the doubles and adds involve multiple operations which generate unique power signatures. By observing these power signatures as shown schematically in FIG. 1(a), the attacker may derive a sequence of 0s and 1s and thus, the scalar or exponent being used.

The Montgomery method is preferable in EC cryptographic systems because of its extreme efficiency over the straight "double and add" described earlier.

The attack on the Montgomery method as described above is particularly important if performing RSA private key operations. In a recent paper published by Dan Boneh et al entitled "An Attack On RSA Given A Small Fraction Of The Private Key Bits", it has been shown that for RSA with a low public exponent, given a quarter of the bits of the private key, an adversary can determine the entire private key. With this attack combined with the power signature attack described above, the RSA scheme is extremely vulnerable.

Thus, it is an object of this invention to provide a system which minimizes the risk of a successful timing attack particularly when utilizing the Montgomery method on private key operations.

SUMMARY OF THE INVENTION

In accordance with this invention, there is provided a method of computing a multiple k of a point P on an elliptic curve defined over a field, said method comprising the steps of:

a) representing the number k as binary vector of bits $k_i$;

b) forming an ordered pair of points $P_1$ and $P_2$, wherein the points $P_1$ and $P_2$ differ at most by P; and c) selecting each said bits $k_i$ in sequence; and for each of said $k_i$;
   i) upon $k_i$ being a 0
      ii) computing a new set of points $P_1'$, $P_2'$ by doubling the first point $P_1$ to generate said point $P_1'$; and
      iii) adding the points $P_1$ and $P_2$ to generate the point $P_2'$; or upon $k_i$ being a 1 iv) computing a new set of points $P_1'$, $P_2'$ by doubling the second point $P_2$ to generate the point $P_2'$; and v) adding the points $P_1$ and $P_2$ to produce the point $P_1'$, whereby said doubles or adds are always performed in the same order for each of said bits $b_i$, thereby minimizing a timing attack on said method.

In accordance with a further aspect of this invention, the field is either $F_2^m$ or $F_p$.

In accordance with a further aspect of this invention, there is provided a processor hardware for implementing the method.

BRIEF DESCRIPTION OF THE DRAWINGS

These and other features of the preferred embodiments of the invention will become more apparent in the following detailed description in which reference is made to the appended drawings wherein.

DETAILED DESCRIPTION OF THE EMBODIMENTS

Figure 2:
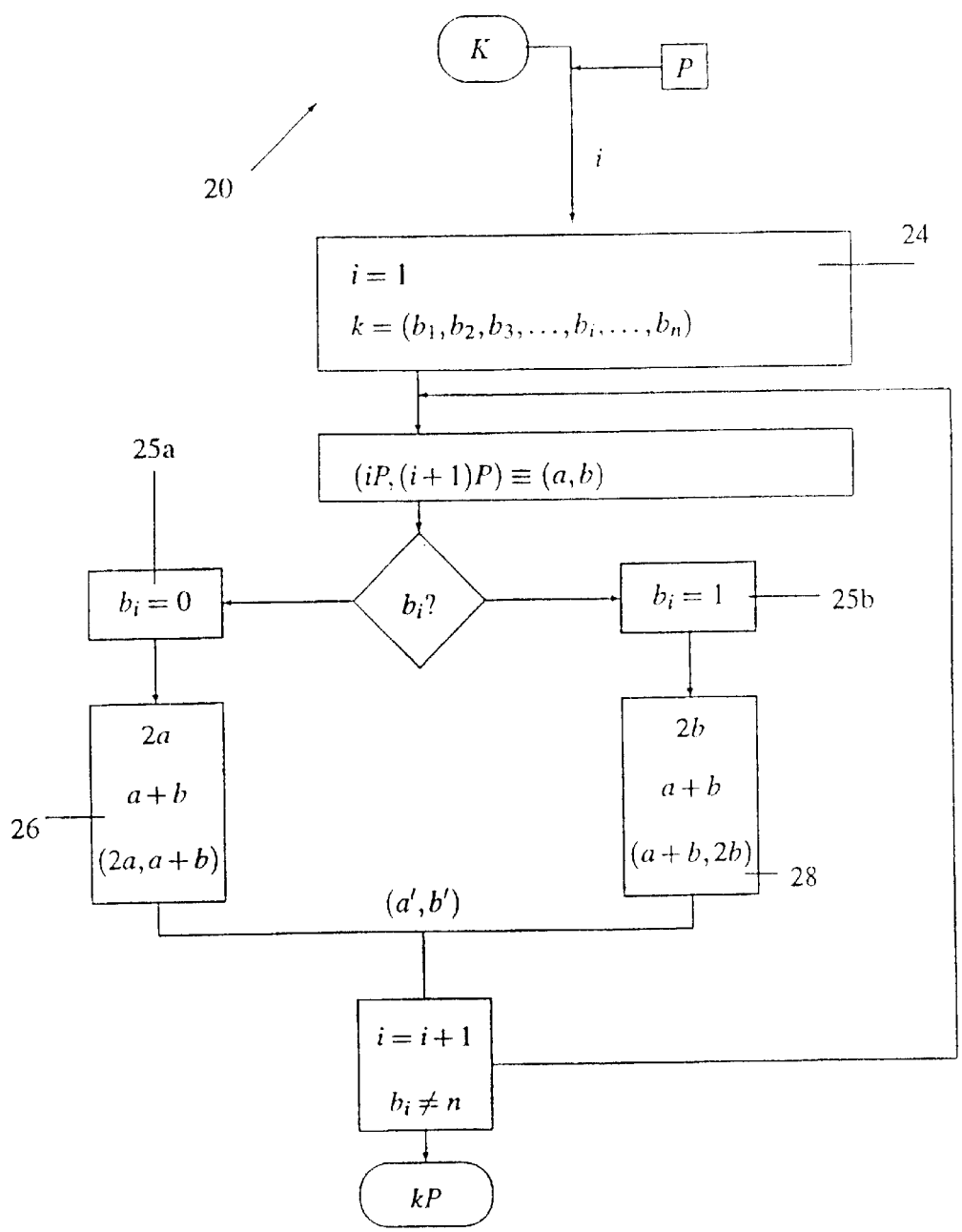
FIG. 2 is a flow diagram of a method according to an embodiment of the present invention.

Referring to FIG. 2, a generalized algorithm for computing a multiple of a point on an elliptic curve defined over a field $F_2^m$ or $F_p$ is indicated generally by numeral 20. In this embodiment, the point P is a parameter of the system. The algorithm computes a multiple of the point kP, wherein the scalar k is possibly a private key or other secret value. The scalar k is represented in a register as a binary vector having bits $b_1$ 24. A pair of elements (a,b) is created, where a and b are points on an elliptic curve which differ at most by P or in the case of the group $F_p$, a and b are elements g which differ by a multiple g.

In the present embodiment, we will consider an elliptic curve scheme thus, the elements a and b correspond to the x-coordinates of an ordered pair of points iP and (i+1)P. An improved Montgomery method for deriving and utilising the x-coordinates of elliptic curve points is described in the applicants pending U.S. patent application Ser. No. 09/047, 518, incorporated herein by reference. A bit $b_i$ beginning with the first bit of the binary representation of the scalar k is evaluated. Depending on the value of the bit, one of two algorithms 26 or 28 are chosen. If the bit is a 0 shown at block 25*a*, the first element a of the input pair (a,b) is doubled and stored in the first element a of the output pair (a',b'). While the first and second elements of the input are added a+b and placed in the second element b' of the output pair (a',b'). If the bit is a 1, shown at block 25*b*, he second element b of the input pair (a,b) is doubled and stored in the second element b at the output pair (a',b'), while the first and second input elements are added, i.e., a+b, and placed in the first element a' of the output pair (a',b'). These steps are repeated for all bits of the scalar k.

Figure 1:
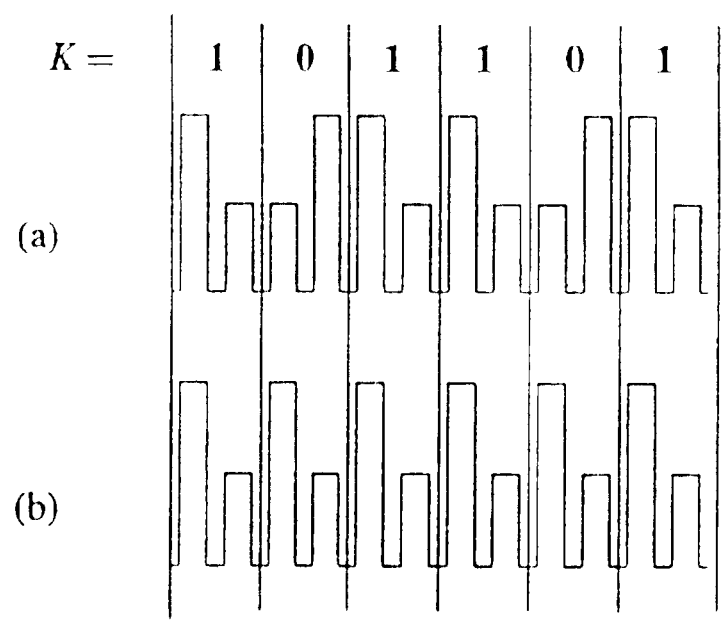
FIGS. 1(*a*) and (*b*) is a schematic representation of a processor power usage signature.

It may be seen thus, from FIG. 1(*b*), that performing the "double" operation followed by the "add" operation for each of the bits, produces a consistent power signature waveform, thus providing little information to a potential attacker. The operations could also be performed in reverse order, i.e., first performing the "add" then the "double" operation. In an RSA scheme, the analogous operations are "square and multiply".

Figure 4:
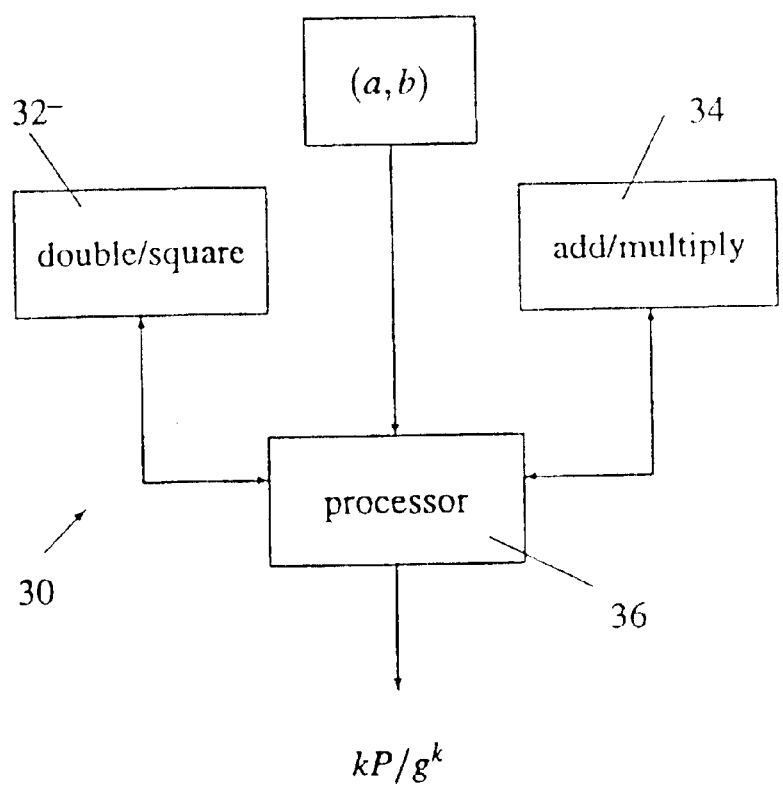
FIG. 4 is a schematic representation of an integer k in binary.

More clearly, suppose we are computing kP using the "binary ladder" method, then after some iterations we have the x-coordinates of (iP, (i+1)P), i.e. having processed i bits of k as shown schematically in FIG. 4. If the next bit to be processed is 0, then we must construct the (ordered pair of) x-coordinates (2iP, (2i+1P)P). If the next bi+b is 1, then we must produce the (ordered pair of) x-coordinates ((2i+1)P, (2i+2)P).

It is likely that the "double" formula requires roughly the same amount of power (and time) regardless of the input. It is likely that add formulas require roughly the same amount of power (and time) regardless of the input. However, an execution of the double formula will require a different amount (less, if the usual Montgomery formulas are used) of power than an execution of the add formula.

Hence, by monitoring the power bar, we can distinguish between a "double" and an "add". Thus, if these equations are executed in a consistent order, then the power signatures of a 1 being processed or a 0 being processed are indistinguishable. Each consists of a "double" power signature, followed by an "add" power signature.

We mention that if the order of evaluation is reversed in both cases, then the power signatures are still indistinguishable.

Hence, this method for computing kP on an elliptic curve is preferred since it avoids revealing the integer k through power consumption statistics. When the "Montgomery" "double" and "add" formulas are used, this method is also efficient, especially when the projective form is used which avoids inversions.

In the context of efficiencies, it is noted that at each step of the "Binary ladder" method, two independent operations must be performed. That is, the results of the "add" formula are not needed for the "double" formula and vice versa. This allows for an efficient parallel hardware implementation.

Figure 3:
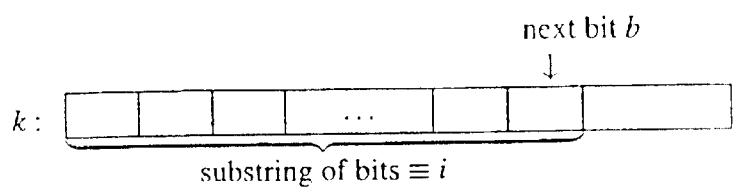
FIG. 3 is a schematic diagram of a symmetric processor implementing a method according to an embodiment of the present invention.

Thus, referring to FIG. 3, a schematic parallel hardware implementation of the present method is shown by numeral 30. In this implementation, a first and second special purpose processor is provided. The first processor 32 performs either a "double" or "square or both operations, while the second processor 34 performs a "add" or "multiply" or both operations. A main processor 36 determines which of the special processor 32 and 34 are activated.

Each processor 32 and 34 are driven simultaneously. (The circuits may take different times to execute, however). The inputs and outputs of these circuits are dealt with in accordance with the case we are in, i.e., with bit $b_i$=0 or with bit $b_i$=1. This simple instance gives a speed up of almost a factor 2 over a serial implementation. Note that at least in the case of the traditional projective Montgomery formulae, the add circuit takes longer and is more complicated than the double circuit. Since there is no need to have the double circuit finish sooner than the add circuit, it can be slower. In practice, this might mean that the double circuit can be built more cheaply.

Although the invention has been described with reference to certain specific embodiments, various modifications thereof will be apparent to those skilled in the art without departing from the spirit and scope of the invention as outlined in the claims appended hereto.

We claim:

1. A method of computing a multiple k of a point P on an elliptic curve defined over a field in a processor which generates distinct power signatures for adding and doubling operations, said method comprising the steps of:

a) representing the number k as binary vector of bits $k_i$;

b) forming an ordered pair of points $P_1$ and $P_2$, wherein the points $P_1$ and $P_2$ differ at most by P; and c) selecting each of said bits $k_i$ in sequence; and for each of said bits $k_i$;

i) upon $k_i$ being a zero, computing a new set of points $P_1'$, $P_2'$ by first doubling the first point $P_1$ to generate said point $P_1'$ and thereby producing a first power signature, and subsequently adding the points $P_1$ and $P_2$ to generate the point $P_2'$ and thereby producing a second power signature distinct from said first power signature; or ii) upon $k_i$ being a one, computing a new set of points $P_1'$, $P_2'$ by first doubling the second point $P_2$ to generate the point $P_2'$ and thereby producing said first power signature; and subsequently adding the points $P_1$ and $P_2$ to produce the point $P_1'$, and thereby producing said second power signature;

whereby said doubles or adds are always performed in the same order for each of said bits $k_i$, thereby producing a consistent power signature waveform and minimizing a timing attack on said method.

2. A method as defined in claim 1, said field being defined over $F_2^m$.

3. A method as defined in claim 1, said field being defined over $F_p$.

* * * * *

UNITED STATES PATENT AND TRADEMARK OFFICE
CERTIFICATE OF CORRECTION

PATENT NO. : 6,738,478 B1
DATED : May 18, 2004
INVENTOR(S) : Scott A. Vanstone et al.

Page 1 of 1

It is certified that error appears in the above-identified patent and that said Letters Patent is hereby corrected as shown below:

Title page,
Item [86], PCT No., "PCT/CH99/00919" should read -- PCT/CA99/00919 --.
Insert Item:
-- [30]  Foreign Application Priority Data
Oct. 28, 1998  (CA) ............... 2,252,078 --.
Item [57], delete the ABSTRACT in its entirety and insert therefor:
-- A method of computing a multiple k of a point P on an elliptic curve defined over a field in a processor which generates distinct power signatures for adding and doubling operations comprises representing the number k as binary vector of bits $k_i$; forming an ordered pair of points $P_1$ and $P_2$, wherein the points $P_1$ and $P_2$ differ at most by P; and selecting each of the bits $k_i$ in sequence. Upon $k_i$ being a zero, a new set of points $P_1`$, $P_2`$ is computed by first doubling the first point $P_1$ to generate the point $P_1`$ and produce a first power signature. The points $P_1$ and $P_2$ are added to generate the point $P_2`$ and produce a second power signature distinct from the first power signature. Upon $k_i$ being a one, a new set of points $P_1`$, $P_2`$ is computed by first doubling the second point $P_2$ to generate the point $P2`$ and produce the first power signature. The points $P_1$ and $P_2$ are added to produce the point $P_1`$, and produce the second power signature. The doubles or adds are performed in the same order for each of the bits $k_1$, and produce a consistent power signature waveform. --.

Column 6,
Line 5, "arc" should read -- are --.

Signed and Sealed this

Seventh Day of September, 2004

JON W. DUDAS
*Director of the United States Patent and Trademark Office*